United States Patent
Jain et al.

(10) Patent No.: US 8,472,413 B2
(45) Date of Patent: Jun. 25, 2013

(54) PROTOCOL FOR WIRELESS NETWORKS

(75) Inventors: Vivek Jain, Mountain View, CA (US); Thomas Alfons Hogenmueller, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 964 days.

(21) Appl. No.: 12/469,112

(22) Filed: May 20, 2009

(65) Prior Publication Data
US 2010/0296492 A1 Nov. 25, 2010

(51) Int. Cl.
*H04W 4/00* (2009.01)
*H04J 3/00* (2006.01)
*H04L 12/43* (2006.01)

(52) U.S. Cl.
USPC ............ 370/336; 370/328; 370/345; 370/458

(58) Field of Classification Search
None
See application file for complete search history.

(56) References Cited

U.S. PATENT DOCUMENTS

| | | | | |
|---|---|---|---|---|
| 7,836,329 | B1* | 11/2010 | Singhal et al. | 714/4.1 |
| 2002/0105970 | A1* | 8/2002 | Shvodian | 370/468 |
| 2004/0082294 | A1* | 4/2004 | Ekl et al. | 455/3.05 |
| 2004/0147202 | A1* | 7/2004 | Brabrand | 446/454 |
| 2005/0180385 | A1* | 8/2005 | Jeong et al. | 370/350 |
| 2005/0226275 | A1 | 10/2005 | Hrycaj et al. | |
| 2008/0025224 | A1* | 1/2008 | Eguchi | 370/241 |
| 2009/0233635 | A1* | 9/2009 | Li et al. | 455/509 |

FOREIGN PATENT DOCUMENTS

DE 10 2007061663 A1 11/2008

OTHER PUBLICATIONS

Tamer Elbatt, et al.: "Potential for Intra-Vehicle Wireless Automotive Sensor Networks"; Sarnoff Symposium, 2006 IEEE; IEEE Piscataway, NJ, USA, Mar. 27, 2006, pp. 1-4 (4 pages); XP031266807; ISBN: 978-1-4244-0002-7. The whole document relevant to Claims 1-8.

\* cited by examiner

*Primary Examiner* — Jutai Kao

(57) ABSTRACT

A wireless transmission method includes providing a commanding node and a plurality of sub-networks. Each of the sub-networks includes at least one responding node. Time slots are assigned to the sub-networks such that time slots assigned to each sub-network are interleaved in time with time slots assigned to at least one other sub-network. Within each time slot, at least one acknowledgement packet is transmitted from the at least one responding node before a command packet is sent from the commanding node within the time slot. Each at least one acknowledgement packet indicates whether or not a most recent command packet from the commanding node was correctly received by the responding node.

20 Claims, 11 Drawing Sheets

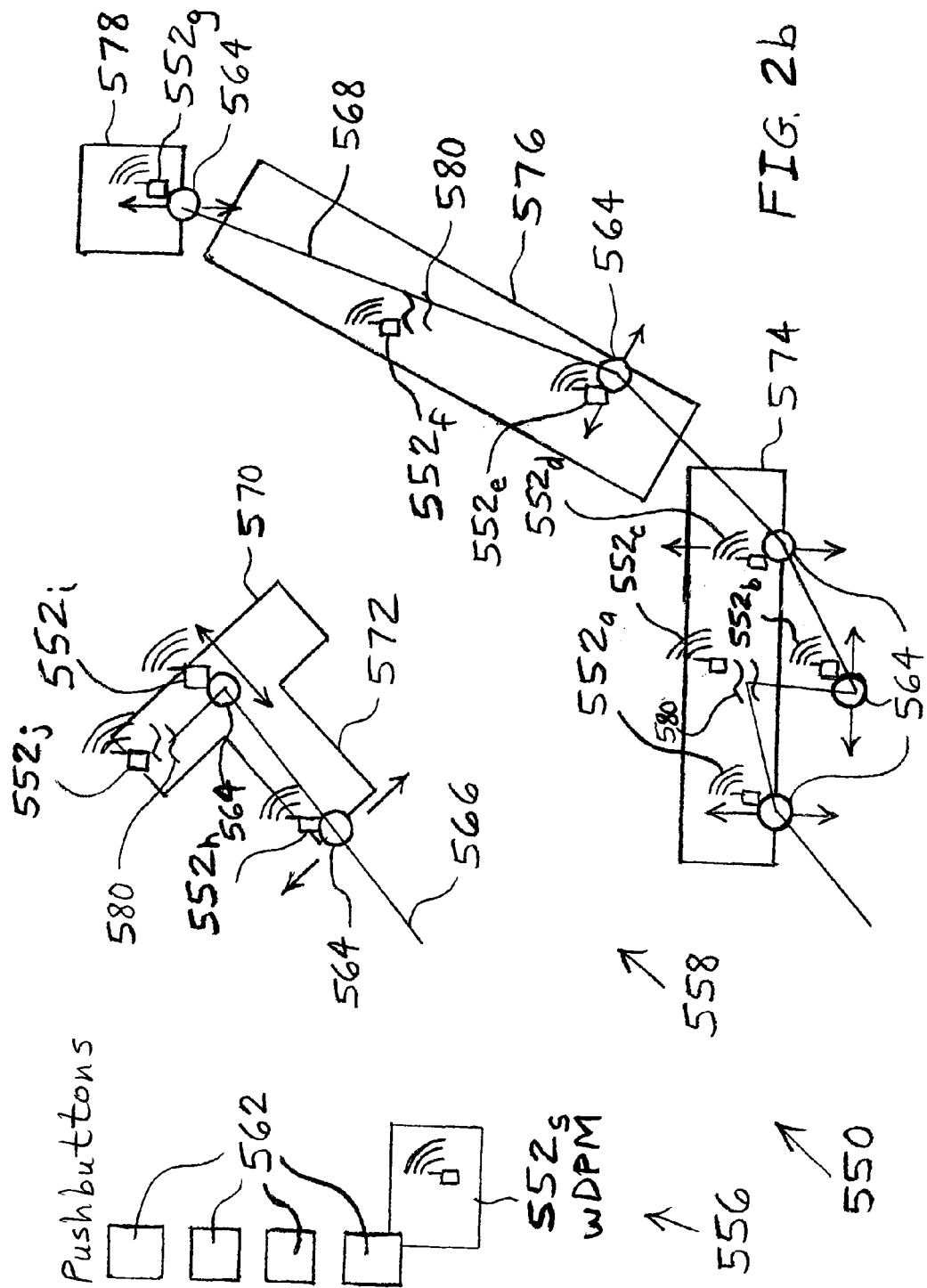

| CNID/Network ID | List ID | Node ID | Memory # | Position/Status |
|---|---|---|---|---|
| 1 | 2 | e | 1 | X |
| 1 | 2 | e | 2 | X |
| 2 | 3 | a | 1 | X |
| 3 | 1 | h | 3 | X |
| ... | | | | |

FIG. 8

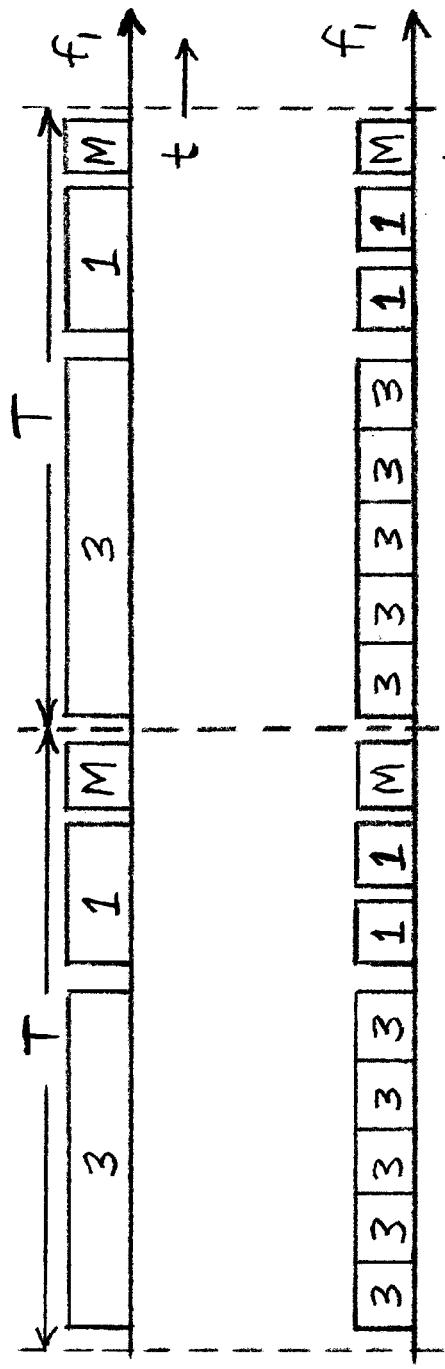
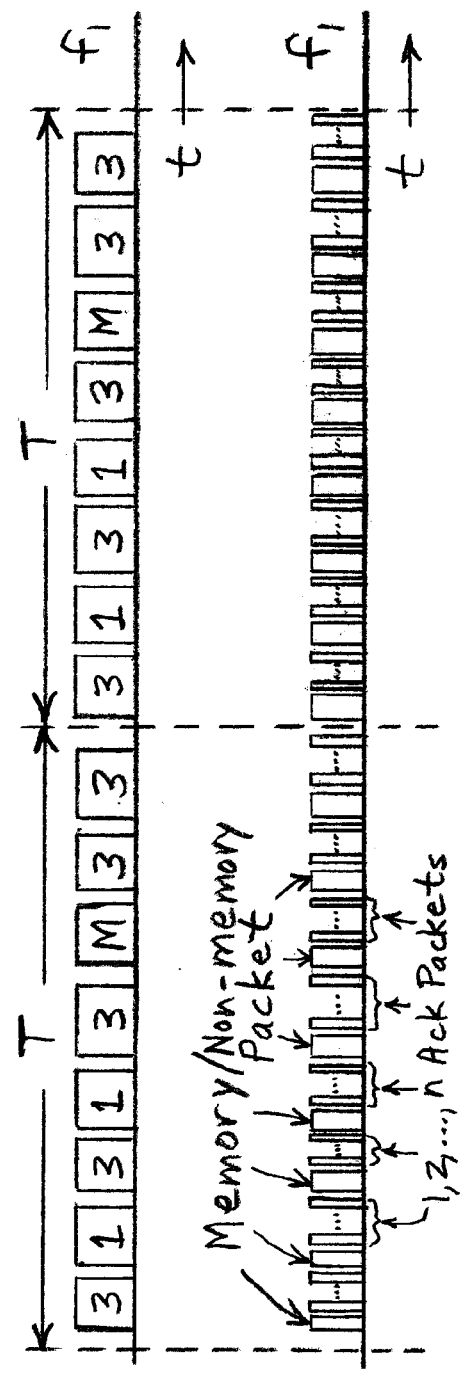
FIG. 9a
FIG. 9b

PROTOCOL FOR WIRELESS NETWORKS

BACKGROUND

1. Field of the Invention

The present invention relates to wireless networks, and, more particularly, to protocols for wireless networks.

2. Description of the Related Art

Typically, automotive body domain applications such as seat control, window lift, mirror adjustment, and light control are distributed over the entire car and are interconnected via field bus communication systems. Current architectures have grown fast over the last decades as more and more convenience functions are introduced to the automotive industry.

The current architectures are hierarchical architectures in which several electronic control units (ECUs) are located near the body domain applications such as the seat ECU under the seat, the door ECU within the door, the ECU for rear light control in the trunk of the car, etc. All these ECUs are interconnected over field bus systems such as the "controller area network" (CAN) field bus, and these ECUs form the first hierarchy of the system. This field bus of the first hierarchy can also be regarded as the backbone network of the body domain.

The ECUs usually consist of a microcontroller and so-called peripheral drivers such as semiconductor switches, relays, signal amplifiers, etc. From the ECUs, several point-to-point wires connect to the peripherals of the applications like the motors (window, lift, seat adjustment), pushbutton panels, heating elements, sensors, etc. The number of these peripherals is constantly increasing for each application. For example, fifteen years ago a comfort seat had only three motors to move the seat forward and backward, to adjust the backrest, and to adjust the height. However, current seats may have about fifteen motors for additional functions such as air ventilation, massage functions, etc.

In order to connect the peripherals, a large number of cables may be necessary, which increases the complexity of the cable harness, increases the weight of the car, and increases the costs of the car. The increase in the number of cables may also lead to reliability problems in areas where the cable harness is mounted on moveable parts such as the side mirror, doors, seat, etc. Hence, in known architectures a second hierarchy order in the form of a so-called "subsystem" may be provided. Subsystems may have their own wired communication network which is usually a low cost communication system such as a local interconnect network (LIN). In contrast to the backbone, these networks are usually master-slave systems and not multimaster systems. The ECU that has access to the backbone is usually the master and the peripherals are the slaves. The ECU is also the gateway between the backbone and the subsystem.

The state-of-the-art of automotive electronics is progressing rapidly and it is projected that electronics alone will make up forty percent of the total cost of future cars. All these electronic units in the vehicle are connected through different bus systems depending on the application requirements. Typically, a hierarchical body domain automotive network 100 (FIG. 1) consists of several sub-networks, such as sub-networks 112, 114, connected together to form a larger network. The sub-networks technology being used is, for instance, a Local Interconnect Network (LIN). Each sub-network consists of a gateway node or ECU 116 and some sensor/actuator nodes 118. Network 100 may include a wired backbone 120 compatible with a Controller Area Network (CAN), FlexRay, Ethernet, etc. Network 100 may also include a body computer 124 and wired communication links 122 compatible with a CAN, Local Interconnect Network (LIN), FlexRay, Ethernet, etc.

ECUs 116 may be interconnected with each other over wired backbone field bus systems 120. Peripherals 118 may be directly connected to ECUs 116. Peripherals 118 may include tiny electronics and may communicate over another field bus with the main ECU. Thus, ECUs 116 may function in such architecture as gateways which communicate on one end with network backbone 120 and on the other end with the local sub-networks. The sub-networks may be organized in master-slave relationships in which the ECU is the master for the distributed tiny electronics in peripherals 118.

A problem associated with the architecture of FIG. 1 is that is that it has poor reliability. For example, if one of the ECUs fails, then the entire associated subsystem is no longer able to operate. Another problem is that there may be long time delays for end-to-end communication as gateways become bottlenecks. Yet another problem is that modularity and scalability are limited by the underlying sub-network systems.

Although implementing at least some of the architecture of FIG. 1 wirelessly has been considered, wireless communication is unpredictable and hence raises questions about the responsiveness of such a system as compared to wired networks. Another challenge is in operating the actuators in a given priority order.

What is neither disclosed nor suggested in the art are protocols that may avoid the above-mentioned problems and provide more robust network performance.

SUMMARY OF THE INVENTION

The present invention provides novel protocols for controlling actuators in wireless networks. The present invention may be applicable for automotive networks as well as for other applications. For example, the principles of the present invention may be applied to industrial networks, cargo, airplanes, ships, etc.

The invention comprises, in one form thereof, a wireless transmission method including providing a commanding node and a plurality of sub-networks. Each of the sub-networks includes at least one responding node. Time slots are assigned to the sub-networks such that time slots assigned to each sub-network are interleaved in time with time slots assigned to at least one other sub-network. Within each time slot, at least one acknowledgement packet is transmitted from the at least one responding node before a command packet is sent from the commanding node within the time slot. Each at least one acknowledgement packet indicates whether or not a most recent command packet from the commanding node was correctly received by the responding node.

The invention comprises, in another form thereof, a wireless transmission method including providing a commanding node and a plurality of sub-networks. Each of the sub-networks includes at least one responding node. Time slots are assigned to the sub-networks such that time slots assigned to each sub-network are interleaved in time with time slots assigned to at least one other sub-network. Within each time slot, a command packet is transmitted from the commanding node and at least one acknowledgement packet is transmitted from the at least one responding node. The command packet includes a respective selection bit for each of the responding nodes in the sub-network that is assigned to a current time slot. Each selection bit indicates whether the respective responding node is to operate. The command packet also includes at least one direction bit. Each direction bit corresponds to a respective responding node in the sub-network that is assigned to a current time slot. Each direction bit indicates a mode of operation of the respective responding node.

The invention comprises, in yet another form thereof, a wireless transmission method including providing a commanding node and a plurality of sub-networks. Each of the sub-networks includes at least one responding node. One of a plurality of priority levels is assigned to each of the sub-networks. Time slots are assigned to the sub-networks such that time slots assigned to at least one sub-network are interleaved in time with time slots assigned to at least one other sub-network of a same priority level. Within each time slot, a command packet is transmitted from the commanding node and at least one acknowledgement packet is transmitted from the at least one responding node. The command packet includes a respective selection bit for each of the responding nodes in the sub-network that is assigned to a current time slot and is of the same priority level. Each selection bit indicates whether the respective responding node is to operate.

Advantages of the present invention include simpler implementation, modular development, superior composability, and flexibility.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 2b is a schematic diagram of one embodiment of an automotive body domain architecture that may be used in conjunction with at least one embodiment of a protocol of the present invention.

FIG. 8 is one embodiment of an ID translation table that may be maintained at every node according to the invention.

FIG. 9a is a timing diagram of a data-Ack scheme with successive retransmissions according to one embodiment of the invention.

FIG. 9b is a timing diagram of a data-Ack scheme with distributed retransmissions according to one embodiment of the invention.

Figure 1:
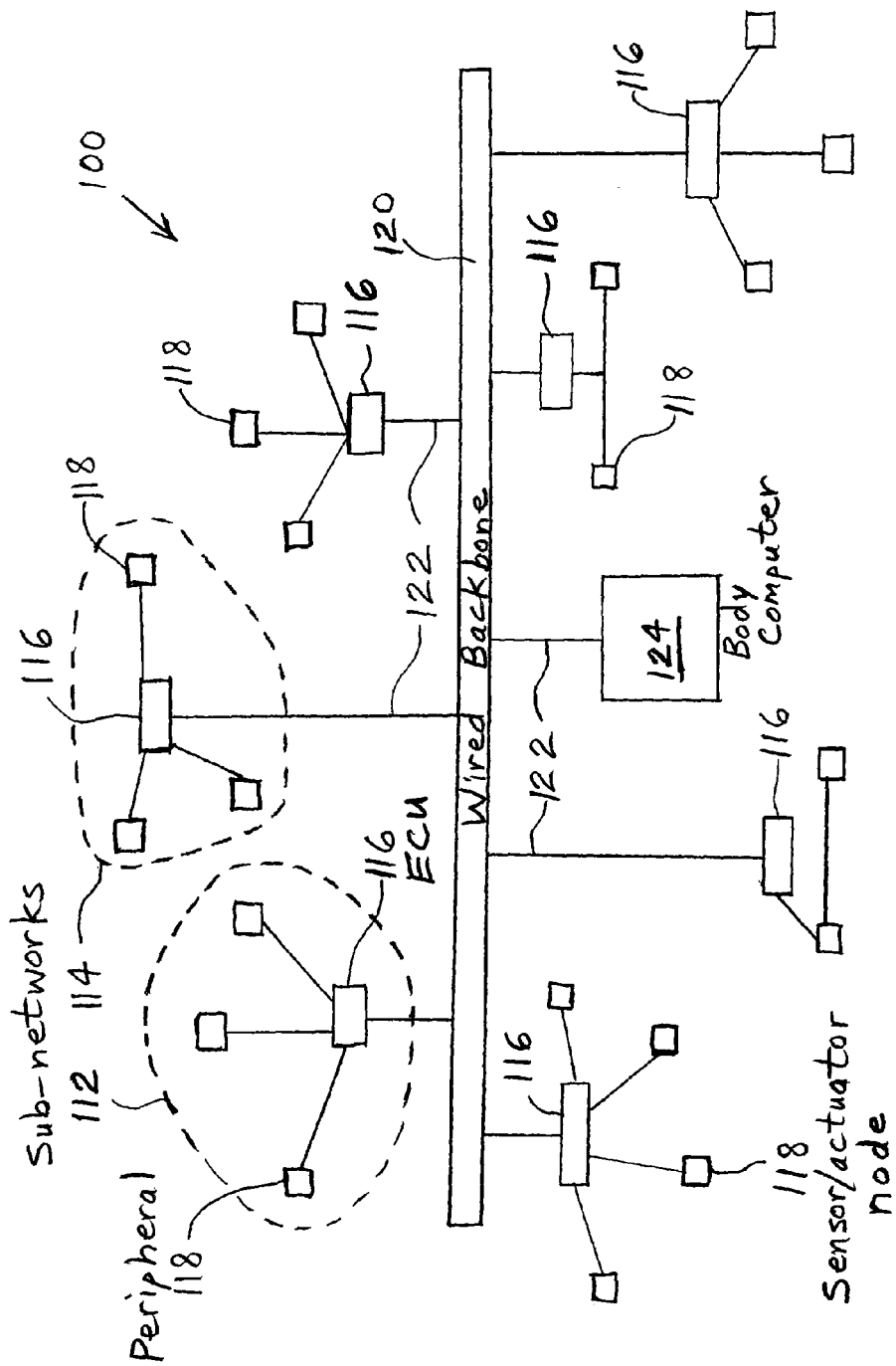
FIG. 1 is a block diagram of a wired hierarchical body domain automotive network architecture of the prior art.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 2A:
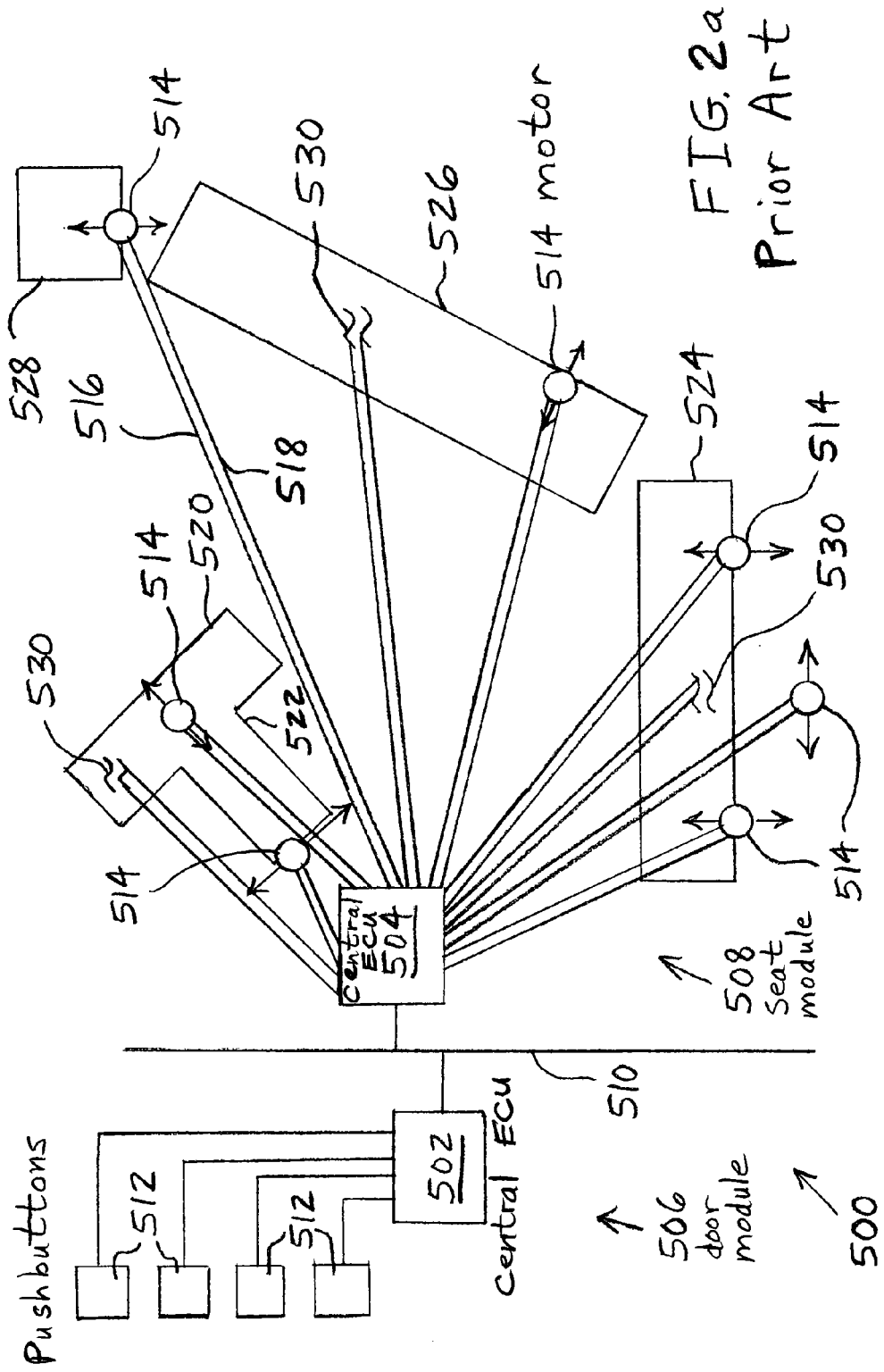
FIG. 2a is a schematic diagram of a prior art automotive body domain architecture.

As described above with reference to FIG. 1, a wired automotive network may include several sub-networks connected together using a backbone network of ECUs and gateways. As shown in FIG. 2a, often several actuators are part of one sub-network and are controlled by a single ECU. The ECU may perform the command translation and send the appropriate signals to the desired actuators in a pre-defined order. The order may be decided according to the functional requirements. Due to practical limitations such as power control, only a set of actuators may be able to function at the same time.

FIG. 2a illustrates a known automotive body domain architecture 500 including central ECUs 502, 504 of a door module 506 and a seat module 508, respectively. ECUs 502, 504 are interconnected by a body CAN 510. Dedicated wires run to the various actuators, such as pushbuttons 512 and DC engines (i.e., motors) 514 with Hall sensors. There are four wires connected to each motor 514. Specifically, two wires are provided in a power cable 516 for powering the motor, and two wires are provided in a communication cable 518 for connection to the Hall sensor to measure the revolution of motor 514. Motors 514 are provided in both steering elements 520, 522 and in seat elements 524, 526, 528. Heaters 530 are provided in steering element 520 and in seat elements 524, 526. For each of cables 516, 518 there are at least two connectors, i.e., one connector for connection to the ECU and another connector for connection to the motor/heater.

An alternative wireless architecture and seat sub-network of lower cost and complexity is described in a U.S. patent application filed even date herewith, entitled "Architecture for Automotive Electrical Body Systems", having inventors Thomas Hogenmueller and Vivek Jain, which is hereby incorporated by reference herein in its entirety.

FIG. 2b illustrates a wDPM-based automotive body domain architecture 550 that may be used in conjunction with the present invention including decentralized wDPMs $552_{a-j}$ instead of intermediary centralized ECUs in a door module 556 and a seat module 558. The only wiring needed is two power cables 566, 568. Each wDPM 552 is associated with the pushbuttons 562, a motor 564 or a heater 580. Each motor 564 may have a Hall sensor to measure the revolution of motor 564 and to communicate the motor position to the associated wDPM $552_{a-j}$ Motors 564 are provided in both steering elements 570, 572 and in seat elements 574, 576, 578. Heaters 580 are provided in steering element 570 and in seat elements 574, 576.

The commanding or supervising node wDPM $552_s$ associated with pushbuttons 562 may communicate with the responding nodes wDPMs $552_{a-j}$ associated with seat module 558. In response to inputs from a user interface, such as a user manually pressing at least one of pushbuttons 562, the wDPM $552_s$ associated with pushbuttons 562 may wirelessly transmit a command signal to at least one of the wDPMs $552_{a-j}$ associated with seat module 558. The command signal may instruct the receiving wDPM $552_{a-j}$ to actuate its associated motor 564 or apply power to, or take power from, its associated heater 580.

Each of wDPMs $552_{a-j}$ associated with seat module 558 may be controlled by commanding node wDPM $552_s$ associated with pushbuttons 562. Within such a scheme, the methods of the present invention may improve the responsiveness of the actuator such that the command executes or starts executing within the given delay. The methods of the present invention may advantageously make it more likely that the operations of higher priority actuators are over before the next group of actuators can operate. Issues similar to those described above may also arise in connection with industrial networks.

Figure 3:
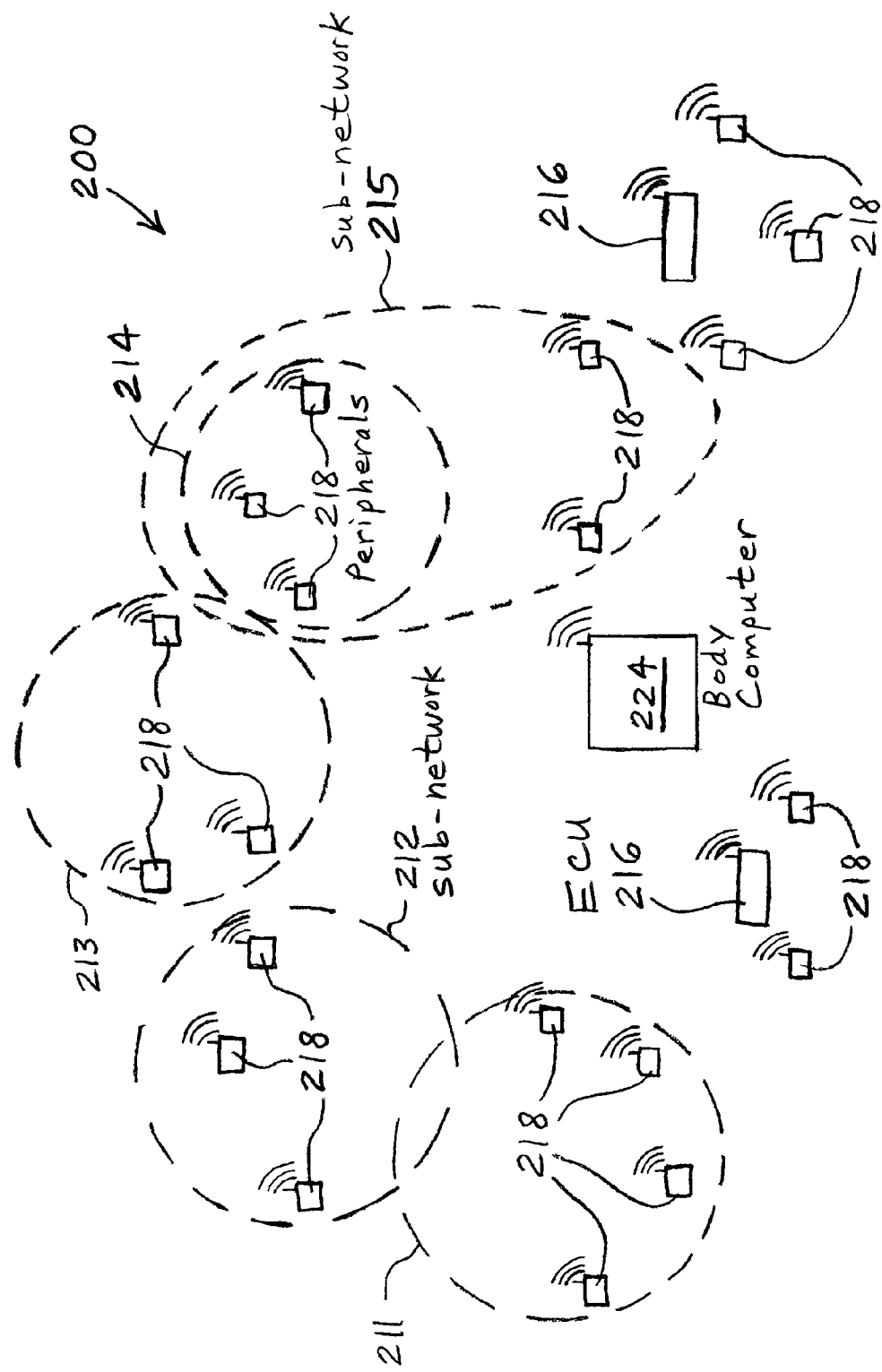
FIG. 3 is a block diagram of one embodiment of a network architecture including a wireless communication system that may be used in conjunction with at least one embodiment of a protocol of the present invention.

Referring now to FIG. 3, there is shown an automotive network 200 of the present invention which may circumvent the problems of the prior art by using wireless communication, and which may be used in conjunction with at least one wireless protocol of the present invention. Network 200 includes sub-networks 211-215 which may each represent a different class of peripherals 218. For example, sub-networks 211-215 may be clusters of pushbutton panels, lights, sensors, small electric motors, and actuator components, respectively. There may be some overlap between sub-networks. For example, the small electric motor sub-network 214 may be a subset of the larger actuator component sub-network 215, as shown in FIG. 3.

Wireless gateway ECUs 216 may communicate wirelessly, such as via radio frequency communication, with wireless sensor/actuator nodes 218 within the sub-network of each gateway ECU 216. A body computer 224 may be in direct wireless communication with peripherals 218 in sub-networks 211-215, and may communicate via the ECUs 216 with peripherals 218 that have the ECU 216 in their sub-network.

In at least one embodiment of the invention, only one wireless communication system may be used for the entire body domain. As is evident from FIG. 3, ECUs 216 may be largely eliminated. In other embodiments, ECUs may be completely eliminated. In the absence of ECUs, the actuator, sensors, and pushbutton panels may have very small electronics with a wireless communication interface (e.g., a wireless distributed peripheral module (wDPM)). In at least one embodiment of the invention, only a single communication interface is used for the body domain, replacing centrally-organized ECUs with non-centralized wDPMs, and use of the new communication pattern in which peripherals may communicate directly instead of using an ECU as an intermediary.

In order to provide a framework for protocols of the present invention, a generic wireless controller area network (sub-network level) may be defined with a commanding node and N number of actuators with the following five conditions. First, each actuator has a priority $p_i$, where i∈[1, N] and at a given time only n actuators can operate. Second, each node is equipped with a radio module and hence the mode of communication between all nodes in the system is wireless. Third, the commands issued by the commanding node fall into two categories: Memory commands were each actuator needs to adjust itself to a pre-defined position; and Non-memory commands which include general and diagnostic commands. Fourth, the commanding station does not know how much time is needed by the nodes to complete the desired action. Fifth, there are few memory commands wherein the desired actuators are set in pre-defined positions. The memory positions are stored by the respective nodes and not by the commanding stations as in current systems. This implies that all actuator nodes know the position they have to reach for a given memory function. The position can be a function of steps, motor rotations, etc.

The framework for protocols of the present invention may also define the following two conditions for the overall network. First, the vehicle can have M such sub-networks in the vicinity using the same radio modules and frequency spectrum. Second, there is a maximum time T bounding the sub-network responsiveness, i.e., the time delay between the time a command is issued and the time when at least one operation is started is ≧T, for each of these sub-networks.

Figures 4A, 4B:
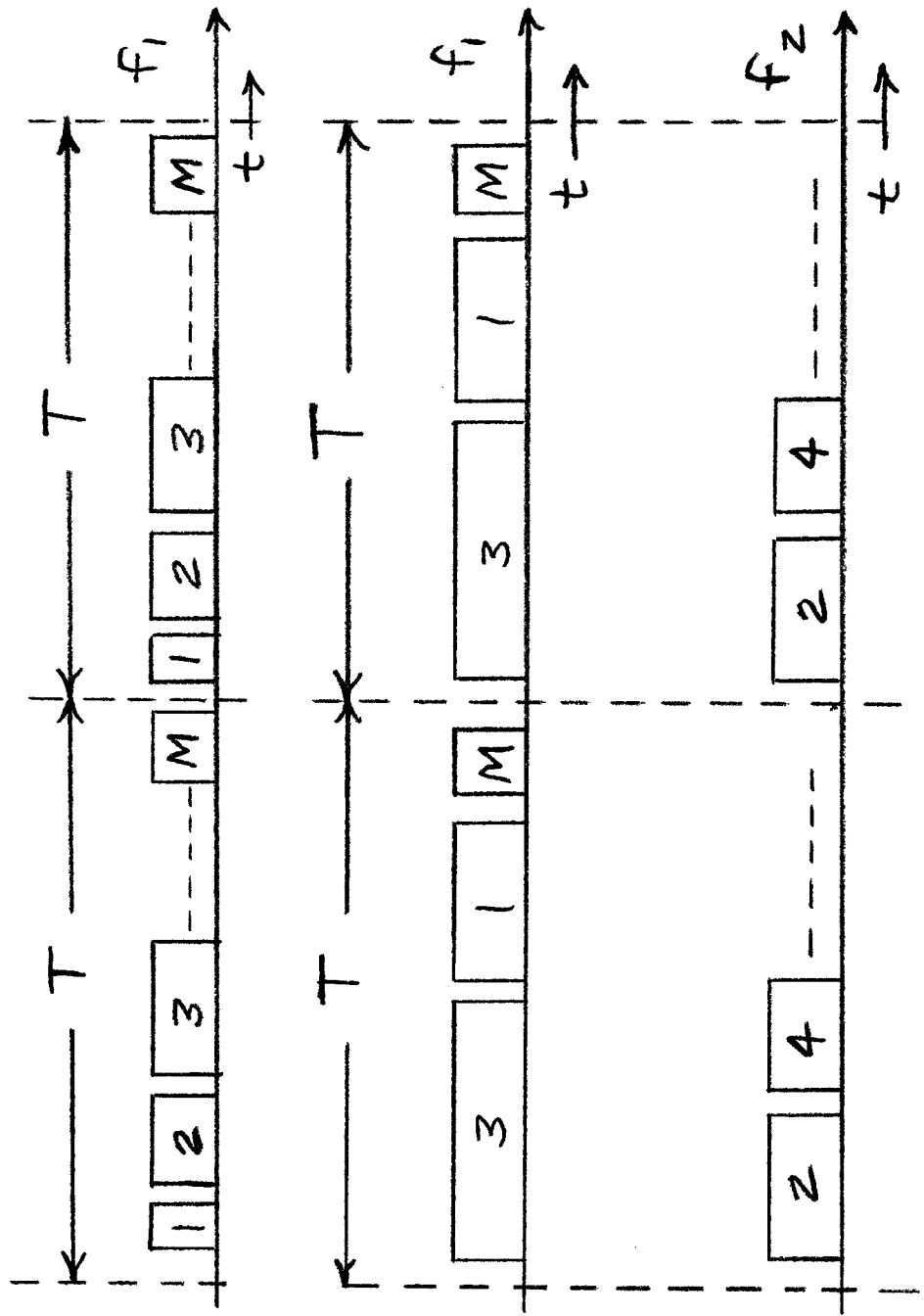
FIG. 4a is a diagram of time-slot assignments for sub-networks in which all sub-network time slots are accommodated on one channel, in accordance with one embodiment of the invention.
FIG. 4b is a diagram of time-slot assignments for sub-networks including optimal assignment of sub-network time slots on different frequency channels, in accordance with another embodiment of the invention.

The overall system requirements on the network level need to be satisfied by the protocol of the invention. Consider a time scale in which each sub-network is assigned a time slot as shown in FIG. 4a. It may be assumed that each of these sub-networks requires $t_j$ time to finish the task, where j∈[1, M]. Then, they all fit on the same time scale (or same frequency channel) while satisfying the system requirements, if and only if, $$\sum_{j=1}^{M} t_j \leq T. \tag{1}$$

Otherwise, more channels may be required and the time slots may be distributed on different channels as shown in FIG. 4b. However, it may be most efficient to use only the minimal number of channels. The problem can be modeled as a 0-1 knapsack problem:

$$\text{maximize} \sum_{j=1}^{M} x_j \tag{2}$$

$$\text{subject to } \sum_{j=1}^{M} t_j x_j \leq T,$$

$$x_j = 0 \text{ or } 1 \text{ and } j \in [1, M]$$

Further, if the sub-networks also have priorities $P_j$, where j∈[1, M] then, (2) modifies as:

$$\text{maximize} \sum_{j=1}^{M} P_j x_j \tag{3}$$

$$\text{subject to} \sum_{j=1}^{M} t_j x_j \leq T,$$

$$x_j = 0 \text{ or } 1 \text{ and } j \in [1, M]$$

The above problem by itself is nondeterministic polynomial-time hard (NP hard), but can be solved by using a Greedy approximation algorithm iteratively until all sub-networks are assigned to a time slot. This may be achieved by sorting the sub-networks according to $x_j$ or $P_j x_j$ (depending on the case) and then putting the highest ones first on a given channel satisfying the condition that their aggregated time is less than T. The process may be repeated until all sub-networks are accommodated as shown in FIG. 4b.

Figure 5:
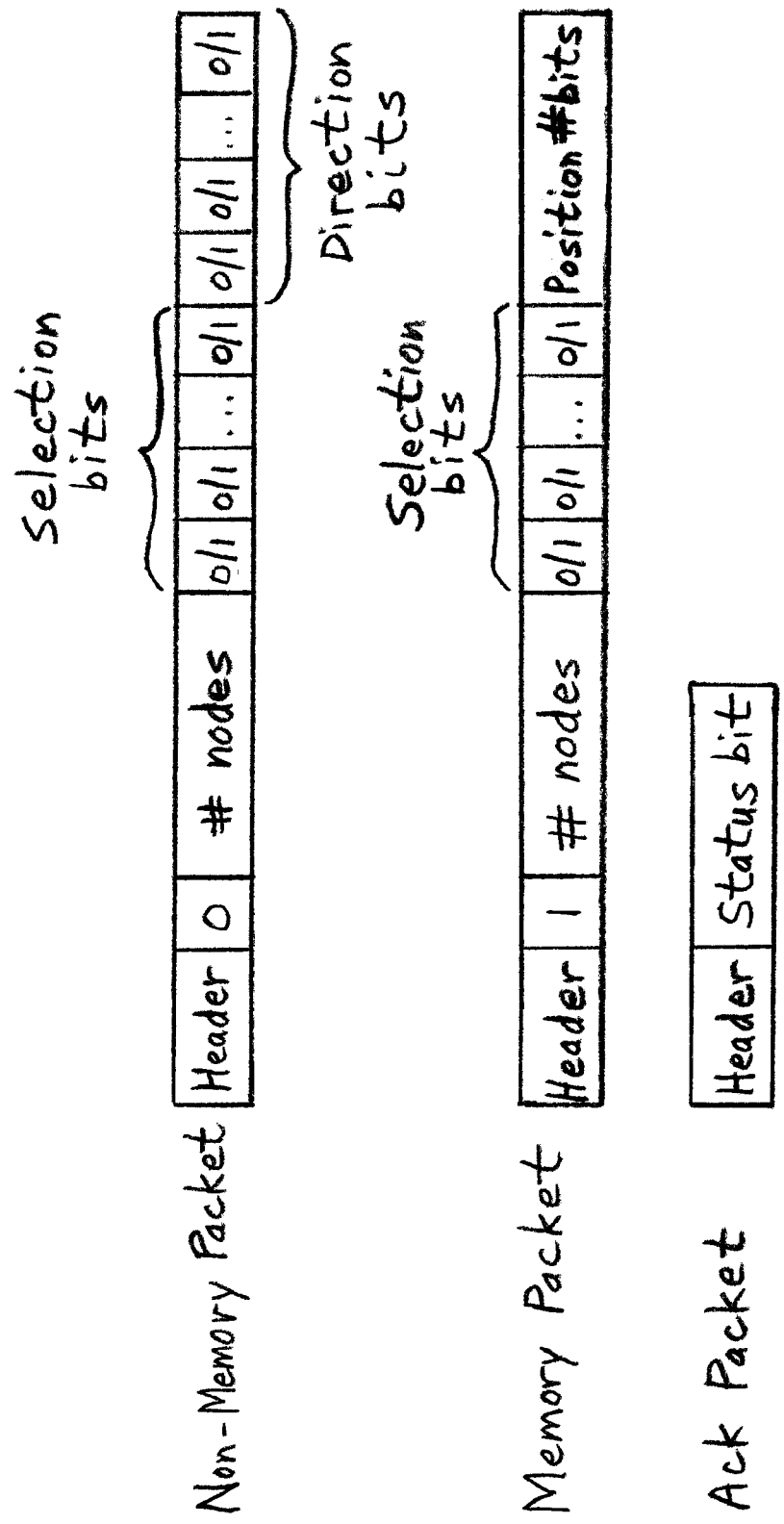
FIG. 5 is a timing diagram of one embodiment of packet formats with selection and direction bits according to one embodiment of the present invention.

The invention may solve sub-network issues on a channel-by-channel basis. There may be three types of packets in the sub-network: memory, non-memory and Ack packets as shown in FIG. 5. The protocol header for each packet may include some of the following: message identification (ID), car ID, sub-network ID, node ID, and so on. The Ack packet may include one or more bits stating whether the operation by the actuator is over or not. An absence of an Ack packet may be an implicit negative acknowledgment while its presence may be an explicit acknowledgement. The data packets, on the other hand, along with the protocol header also may include: a bit identifying the data packet as a memory/non-memory data packet; the number of nodes in the sub-network; and/or the node selection bits. Bits for the actuators that should start operating may be set to "1".

The above information may be followed by the memory position/number bits for the memory data packets. In non-memory packets, selection bits may be followed by the direction bits which inform the selected actuators to perform respective action. As an example, if an actuator is a motor, then the direction bit controls the direction of rotation as clockwise or counterclockwise. If an actuator is a heater, then the direction bit controls the state as ON or OFF. The mapping of the nodes in the sub-network to the selection and direction bit positions may be done during the initial set-up phase. So, every node may know which bit position or positions corresponds to that node (i.e., to itself) in the memory/non-memory packets.

Figure 6:
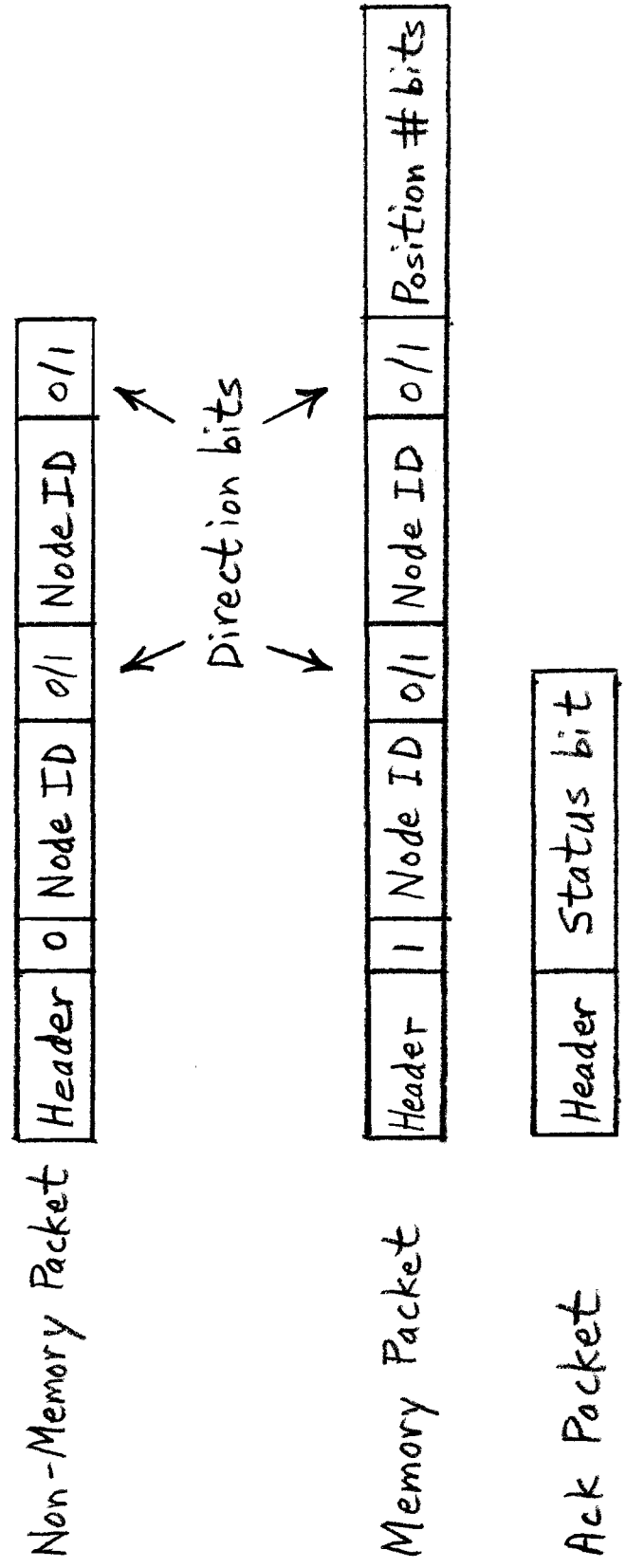
FIG. 6 is a timing diagram of one embodiment of packet formats with node IDs and direction bits according to one embodiment of the present invention.

An alternate packet format can also include addresses of the nodes explicitly if the total number of nodes (n) that can operate simultaneously is not greater than the number of node addresses that can be accommodated within a packet. In the example shown in FIG. 6, the number of node addresses that may included in a packet is two (n=2). In this case, the memory packet has an additional field for identifying memory position/number as compared to the non-memory packet.

Figure 7A:
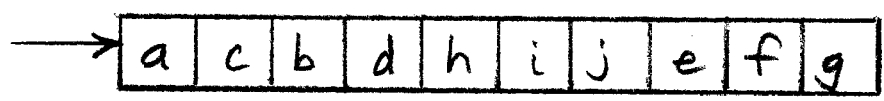
FIG. 7a is a diagram of a priority order of nodes of a priority list according to one embodiment of the invention.

Each commanding/supervising node $552_s$ may maintain a priority list with nodes in a priority order, an example of which is shown in FIG. 7a ($552_a$, $552_c$, $552_b$, $552_d$, $552_h$, $552_i$, $552_j$, $552_e$, $552_f$, $552_g$). Considering that at a given time only n nodes can operate, the commanding station $552_s$ while sending the data packet may set a maximum of n selection bits depending on the priority order. Commanding station $552_s$ may also set the respective direction bits accordingly. Once commanding node $552_s$ has transmitted the packet, commanding node $552_s$ may wait for the Acks in the next slot. If commanding node $552_s$ does not receive an Ack from a node whose bit was set, then commanding node $552_s$ may retain the set bit for that node in the packet. However, If commanding node $552_s$ does receive an Ack, then, depending on whether the actuator is still operating (denoted by the status bit), commanding node $552_s$ may either clear its selection bit or retain it for the next packet. Once commanding node $552_s$ has waited for the n Ack slots, commanding node $552_s$ may send the next packet. If at least one node is finished operating, then commanding node $552_s$ may pick the next node from the priority list.

Figure 7B:
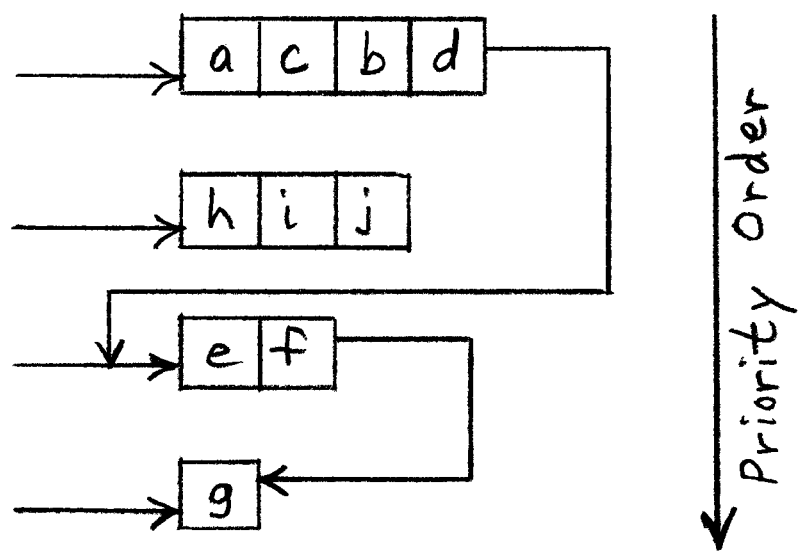
FIG. 7b is a diagram of mutually exclusive priority lists according to one embodiment of the invention.

Under certain conditions, it may not be possible for a low priority node to start operation until the higher priority nodes have completed their operation. In such cases, the commanding node may maintain mutually exclusive node priority lists as shown in FIG. 7b. That is, each command packet may identify one of the priority lists to which the command packet is addressed. In this case, the nodes in a child list may start their operation only once the nodes in the parent list have finished their operation. Thus, responding nodes of a same priority level complete operation before the command packets are sent to the responding nodes of lower priority levels. Commanding station $552_s$ may initiate and complete the desired operation on a list-by-list basis. In the embodiment of FIG. 7b, the selection bit of node e may be set to "1" only after all nodes in the parent list (a, c, b and d) have completed their operation. Depending on the complexity, the Memory and Non-memory packets can have an additional field for a list number. Then, the selection and direction bits may correspond to the nodes in that list only. The tradeoff may be a reduction in the packet length at the expense of the added complexity that the node now should know in which lists they lie. This information can be exchanged during the initial setup phase.

An actuator can be controlled by several commanding nodes. Hence, each node may maintain a list of commanding nodes, their corresponding list number and its virtual node ID in that corresponding sub-network as illustrated in FIG. 8. This list maybe made during the initial setup phase. In the table, "X" denotes the state as "ON/OFF" or motor position, etc. depending on the actuator/sensor.

In each time slot the commanding nodes of the respective sub-networks may send the command and may seek a response from the node in order to ascertain the status of the command. Considering that the channel is wireless and there might be noise on the channel, multiple such retransmissions may be performed in order to increase the reliability and responsiveness of the command. Thus, the sub-network time slot ($t_j$) may include the retransmissions also. Then, on the time scale, the overall sub-network time slot can be broken into (re)transmission slots in the following two ways as illustrated in FIGS. 9a and 9b. The successive retransmission scheme of FIG. 9a may include assigning each sub-network to consecutive time slots. The distributed retransmission scheme of FIG. 9b, however, may include assigning time slots to the sub-networks such that time slots assigned to each sub-network are interleaved in time with time slots assigned to at least one other sub-network. The successive retransmissions scheme (FIG. 9a) may be most commonly used. However, the distributed retransmission scheme (FIG. 9b) has an advantage that if the channel is noisy for long time durations then the distributed retransmission scheme has a better response time as compared to the successive retransmissions scheme. The main reason for this is that long noise/fading time durations can result in loss of the main packet and its retransmissions as well.

In the distributed retransmissions scheme, the commanding node may transmit the data packet and wait for an Ack. The first Ack slot may be occupied by the highest priority node that has its selection bit "ON", and so on. If the commanding node receives the Ack with a status being that the operation of the node is completed, then, for the next slot the commanding node may select the next node in the priority order for operation. Otherwise, the original node may continue its operation until completion.

Figure 10:
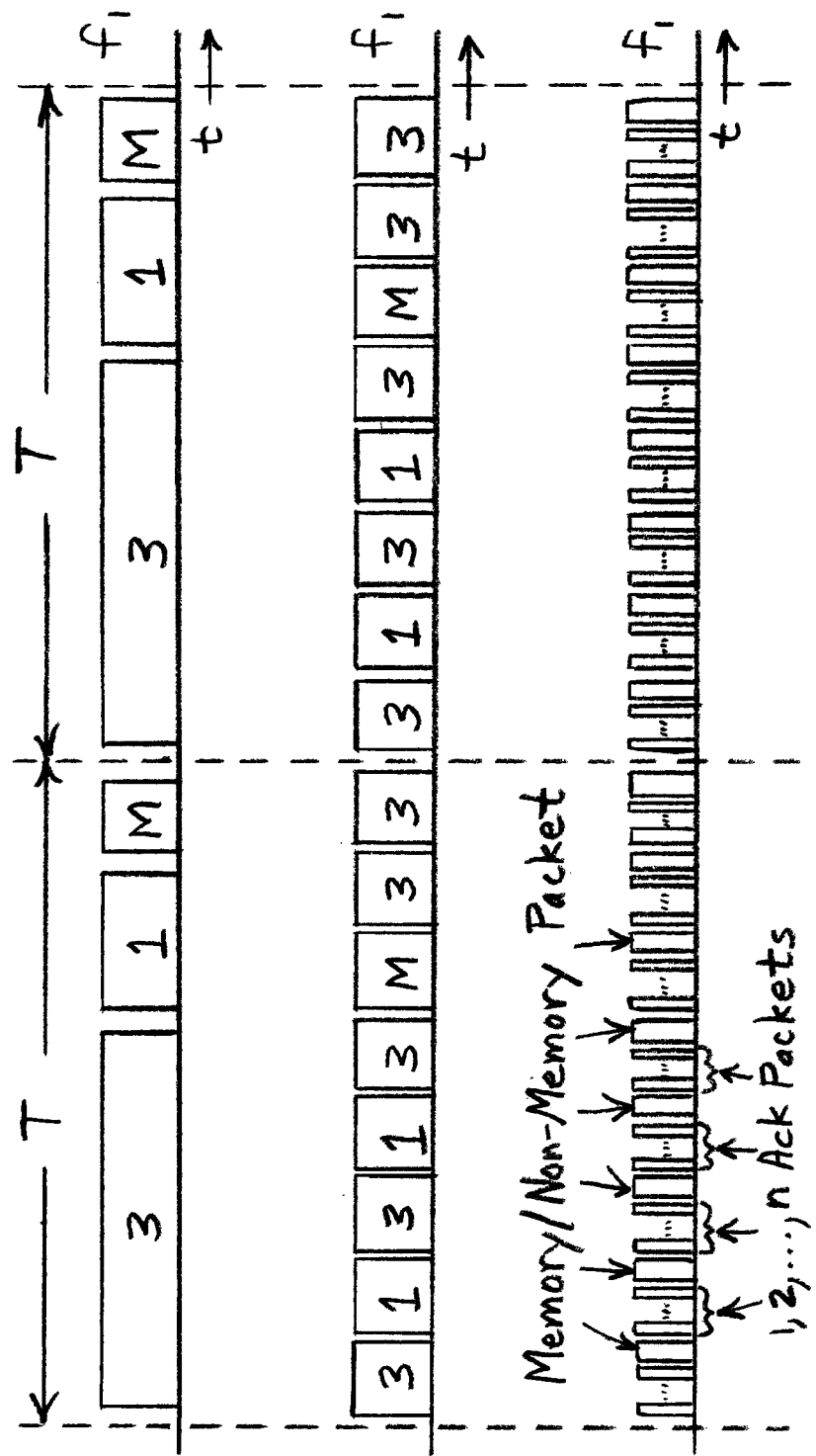
FIG. 10 is a timing diagram of an Ack-data protocol according to yet another embodiment of the invention.

According to another embodiment of the invention, performance of the distributed retransmissions data-Ack scheme of FIG. 9b may be further improved by interchanging or switching the positions of the packet and Ack slots as shown in the Ack-data protocol of FIG. 10. An advantage with the scheme of FIG. 10 is that before sending the commanding packet, the commanding station not only knows whether its last packet was received by the respective nodes but also knows the status of the action, i.e., the commanding station now knows whether to continue sending the same message or whether to send the next message. Therefore, by listening to Ack+Status before sending the packet, the present scheme may save at least one transmission per every new packet as compared to the data-Ack scheme. In the data-Ack scheme, after receiving the Ack with status, the commanding node will transmit the next packet in the next slot (and hence wastes the present slot). On the other hand, if the packet was not successfully received by the intended nodes, then in both schemes the present slot is wasted.

As advances in wireless communication technology enable seamless communication on different frequencies (e.g., frequency multiplexing), completely new communication schemes can be applied, some of which schemes may be described in a U.S. patent application filed even date herewith, entitled "Dynamic Function Slot Assignment in Intra-Vehicular Wireless Networks", having inventors Thomas Hogenmueller and Vivek Jain, which is hereby incorporated by reference herein in its entirety.

In one embodiment, a wireless protocol for an automotive electrical body system may be provided. In a first operation, at least one body component is provided in a vehicle, such as a car, boat, plane, train, etc. The body component may be anything physical device that may be actuated, heated, or, more generally, caused to undergo any type of transformation. In specific embodiments, the body component is a car seat or a steering wheel. The transformation may be, for example, mechanical, electrical, chemical, or a combination of the above.

In a next operation, a plurality of electrical assemblies are coupled to the at least one body component. Each of the assemblies includes a heating element, a motor, or a switch. In the case of a heating element, the heating element may heat the component, such as the steering wheel or car seat. It is also possible that the heating element may heat some substance in the component, such as to initiate a chemical reaction. In the case of a switch, the switch may turn on or turn off a light. In the case of a motor, the power may be applied to the motor to cause the motor to move some component, or at least some part of the component. For example, the motor may move a steering wheel closer to or farther away from a driver, or may raise or lower the base of the steering wheel. In the case of a car seat, the motor may raise or lower the base of the car seat; move the base of the car seat forward or backward; rotate the back of the car seat in clockwise or counterclockwise directions; lower or raise the head rest; control air ventilation, or control a massage function. In another embodiment, the motor may raise or lower a car door window.

In another operation, a wireless communication module may be connected to the heater or motor. The wireless communication module may receive external wireless signals, such as from another wireless communication module that is connected to a user interface. The user interface may include pushbuttons or switches, and may be installed on a door of the car. For instance, the user may want to apply heat to the steering wheel or seat, or may want to adjust the position of the rearview mirror or seat. Thus, the user may push a button or press a switch, which may cause wireless command signals to be sent to the wireless communication module that is associated with the motor or heating element.

In another operation, in response to the wireless signals, the wireless communication module may control operation of the heating element or motor. That is, the wireless communication module may apply power to, or remove power from, the heating element or motor to thereby apply or remove heat, or adjust a position of the motor. The wireless communication module may receive signals from the Hall sensor of the motor such that a microcontroller of the wireless communication module may determine a current position of the motor.

In another operation, an electrical conductor, such as a power cable, may be used to interconnect each of the electrical assemblies and carry electrical power to each of the electrical assemblies.

The present invention provides a method for effectively controlling several actuators wirelessly, thereby implementing the desired function. Novel features of the present invention may include the Ack-data protocol with the packet format involving selection and direction bits; wireless control of actuators in automotive and industrial environments; Greedy approximation algorithms for distributing sub-networks on various channels; packet formats with selection and direction bits; mutually exclusive priority lists maintained by the commanding node; an ID translation table including memory positions; function-dependent node distribution to sub-networks (a node can be a part of several sub-networks); and distributed retransmissions for data-Ack protocol.

The invention has been described herein as being applicable to body domain systems within automobiles, buses, trucks, etc. However, in other embodiments, the invention is applicable to other domains within a vehicle, such as power train and chassis control, for example.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A wireless transmission method, the method comprising the steps of:
providing a commanding node and a plurality of sub-networks, each of the sub-networks including at least one responding node;
assigning time slots to the sub-networks such that time slots assigned to each said sub-network are interleaved in time with time slots assigned to at least one other said sub-network; and
within each said time slot, transmitting at least one acknowledgement packet from the at least one responding node before a command packet is sent from the commanding node within the time slot, each said at least one acknowledgement packet indicating whether a most recent command packet from the commanding node was correctly received by the responding node, each said at least one acknowledgement packet including at least one bit stating whether an action by the responding node is over or not.

2. The method of claim 1 wherein the command packet indicates one of:
that the packet is a non-memory packet; and
that the packet is a memory packet.

3. The method of claim 1 wherein each said at least one acknowledgement packet indicates a status of the action by the responding node, the status of the action by at least one said responding node comprises that the action is incomplete.

4. The method of claim 1 wherein the command packet includes a number of the responding nodes in the sub-network that are assigned to a current said time slot.

5. The method of claim 1 wherein the command packet includes a respective selection bit for each of the responding nodes in the sub-network that is assigned to a current said time slot, each said selection bit indicating whether the respective responding node is to operate, and wherein a highest priority said responding node that has its selection bit "ON" transmits a corresponding said acknowledgment packet before any other said responding node in the sub-network.

6. The method of claim 1 wherein the command packet includes at least one direction bit, each said direction bit corresponding to a respective said responding node in the sub-network that is assigned to a current said time slot, each said direction bit indicating a mode of operation of the respective said responding node.

7. The method of claim 6 wherein, if the respective said responding node includes a motor, the direction bit indicates a direction of rotation of the motor.

8. The method of claim 1 wherein each said at least one acknowledgement packet includes a status bit.

9. A wireless transmission method, the method comprising the steps of:
provic a commanding node and a plurality of sub-networks, each of the sub-networks including at least one responding node;
assigning time slots to the sub-networks such that time slots assigned to each said sub-network are interleaved in time with time slots assigned to at least one other said sub-network; and
within each said time slot, transmitting a command packet from the commanding node and at least one acknowledgement packet from the at least one responding node, the command packet including:
a respective selection bit for each of the responding nodes in the sub-network that is assigned to a current said time slot, each said selection bit indicating whether the respective responding node is to operate; and
at least one direction bit, each said direction bit corresponding to a respective said responding node in the sub-network that is assigned to a current said time slot, each said direction bit indicating a mode of operation of the respective said responding nod;
wherein each said at least one acknowledgement packet indicates a status of an action by the responding node in response to the most recent command packet from the commanding node, the status of the action by at least one said responding node comprising that the action is incomplete.

10. The method of claim 9 wherein, if the respective said responding node includes a motor, the direction bit indicates a direction of rotation of the motor.

11. The method of claim 9 wherein each said at least one acknowledgement packet indicates whether a most recent command packet from the commanding node was correctly received by the responding node.

12. The method of claim 9 wherein the status of the action by at least one other said responding node comprises that the action is complete.

13. The method of claim 9 wherein the command packet indicates one of:
that the packet is a non-memory packet; and
that the packet is a memory packet.

14. The method of claim 9 wherein a highest priority said responding node that has its selection bit "ON" transmits a corresponding said acknowledgment packet before any other said responding node in the sub-network.

15. The method of claim 9 wherein the command packet precedes the at least one acknowledgement packet within each said time slot.

16. A wireless transmission method, the method comprising the steps of:
providing a commanding node and a plurality of sub-networks, each of the sub-networks including at least one responding node;
assigning time slots to the sub-networks such that time slots assigned to each said sub-network are interleaved in time with time slots assigned to at least one other said sub-network;
within each said time slot, transmitting a command packet from the commanding node, the command packet including:
a respective selection bit for each of the responding nodes in the sub-network that is assigned to a current said time slot, each said selection bit indicating whether the respective responding node is to operate; and
at least one direction bit, each said direction bit corresponding to a respective said responding node in the sub-network that is assigned to a current said time slot, each said direction bit indicating a mode of operation of the respective said responding node; and
within each said time slot, transmitting at least one acknowledgement packet from the at least one responding node, the acknowledgement packet including at least one status bit stating a status of an action by the responding node.

17. The method of claim 16 wherein, if the respective said responding node includes a motor, the direction bit indicates a direction of rotation of the motor.

18. The method of claim 16 wherein within each said time slot, the command packet precedes the at least one acknowledgement packet within each said time slot, each said at least one acknowledgement packet indicating:
whether a command packet from the commanding node was correctly received by the responding node; and
the status of an action by the responding node in response to the command packet from the commanding node; and
wherein the status of the action by the responding node comprises either that the action is complete or that the action is incomplete.

19. The method of claim 16 wherein a highest priority said responding node that has its selection bit "ON" transmits a corresponding said acknowledgment packet before any other said responding node in the sub-network.

20. The method of claim 16 wherein the command packet indicates that the packet is a non-memory packet or that the packet is a memory packet.

* * * * *